No. 662,458. Patented Nov. 27, 1900.
O. NAGEL.
FLOOR.
(Application filed Oct. 19, 1899.)
(No Model.)
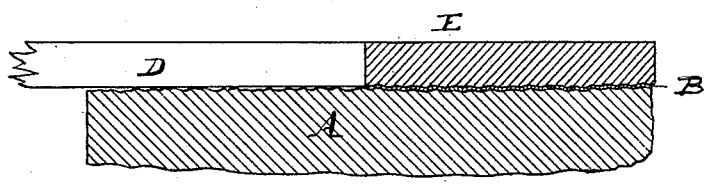
WITNESSES:
F. Stallman
C. H. Poag
INVENTOR
O. Nagel
BY Oscar F. Gunz
his ATTORNEY.

UNITED STATES PATENT OFFICE.

OSKAR NAGEL, OF NEW YORK, N. Y.

FLOOR.

SPECIFICATION forming part of Letters Patent No. 662,458, dated November 27, 1900.

Application filed October 19, 1899. Serial No. 734,122. (No model.)

*To all whom it may concern:*

Be it known that I, OSKAR NAGEL, a citizen of Austria, and a resident of the city of New York, borough of Manhattan, in the county of New York and State of New York, have invented certain new and useful Improvements in Floors, of which the following is a specification.

This invention relates to improvements in floors.

The object of my invention is to provide a new and improved floor which is in a substantially continuous integral piece in contradistinction to floors laid down in separate pieces—such as tiles, mosaics, &c.—and which improved floor is hard, fireproof, durable, does not warp, expand, crack, or break, can be laid on wood or concrete, and is warmer than ordinary stone floors.

My improved floor is composed of a mixture of calcined magnesite, (oxid of magnesium,) chlorid of magnesium, fluorid of calcium, and sawdust, or an equivalent—such as, for example, pulverized asbestos, mineral wood, or any other analogous substance capable of binding the mass.

In the accompanying drawing a vertical sectional view of my improved flooring is shown.

To prepare the mixture, sawdust or its equivalent is first moistened with a solution of chlorid of magnesium containing fluorid of calcium and having a density of about 18° Baumé, whereby the particles of sawdust are each individually hardened by this solution, as they individually absorb sufficient solution to become thoroughly saturated and then harden when the solution dries. Two parts, by measure, of sawdust or any substance of an analogous nature thus prepared, as stated above, are thoroughly mixed with one part, by measure, of burnt magnesia, and this mixture is thoroughly stirred and sifted to break all lumps and to reduce it to as uniform a powder as possible. This mixture is then moistened with a solution of chlorid of magnesium containing fluorid of calcium and which solution is of a density about equal to 28° Baumé. The solution is sprinkled upon the pulverized mixture with a watering-pot and the mixtures worked by means of shovels or other instruments until it has a consistency of a stiff mortar.

The oxid of magnesia used should be entirely free from iron and carbonic acid.

The chlorid-of-magnesium solution is prepared as follows: Melted chlorid of magnesium is dissolved in as little water as possible and a quantity of fluorid of calcium equal to from three to five per cent. of the weight of the chlorid of magnesium is added, and then the solution obtained is diluted until the desired density is obtained.

The above-described mixture of sawdust or its equivalent, oxid of magnesium, chlorid of magnesium, and fluorid of calcium can be spread on a wooden blind floor or upon a concrete bedding. The concrete must be left fairly rough or coarse on its upper surface, and if the mixture is to be laid upon a wooden blind floor the upper surface of the latter must be roughened by means of suitable implements, such as an adz or a pick.

Before placing the mixture upon the blind floor or concrete A the base or support is thoroughly brushed over with a pulpy or thick solution B of chlorid of magnesium containing fluorid of calcium and oxid of magnesium. Then slats D are placed upon the base thus prepared about one-half inch high, or thereabout, and about a yard apart, more or less, and the mixture E is uniformly spread upon the prepared base between the slats flush with the tops of the slats and worked smooth and even and then carefully tamped and rammed. Then the laths are carefully withdrawn lengthwise and the recesses filled with the mixture and the latter worked down to an even finish and again rammed and tamped and then the floor is troweled off perfectly smooth. It sets and hardens in from twelve to eighteen hours and is then polished in any well-known manner.

Any desired coloring-matter may be mixed with the sawdust or the equivalent thereof used.

Wainscoting can be made in the same manner as the floors.

Having described my invention, what I claim as new, and desire to secure by Letters Patent, is—

A floor composed of a base roughened on its upper surface, a coating composed of a mixture of a solution of chlorid of magnesium, fluorid of calcium and oxid of magnesium on such roughened base and a layer on the coating composed of a mixture of oxid of magnesium, chlorid of magnesium, fluorid of calcium and sawdust in about the proportions given upon said coating, the sawdust having been hardened by means of a solution of chlorid of magnesium containing fluorid of calcium before being mixed with the oxid of magnesium, chlorid of magnesium and fluorid of calcium, substantially as set forth.

Signed at New York city, in the county of New York and State of New York, this 21st day of September, A. D. 1899.

OSKAR NAGEL.

Witnesses:
CHARLES W. ENDEL,
OSCAR F. GUNZ.